June 16, 1959 A. FOTI ET AL 2,891,129
HIGH VOLTAGE AUTOMATIC GROUNDING SWITCH
Filed Feb. 19, 1957 2 Sheets-Sheet 1
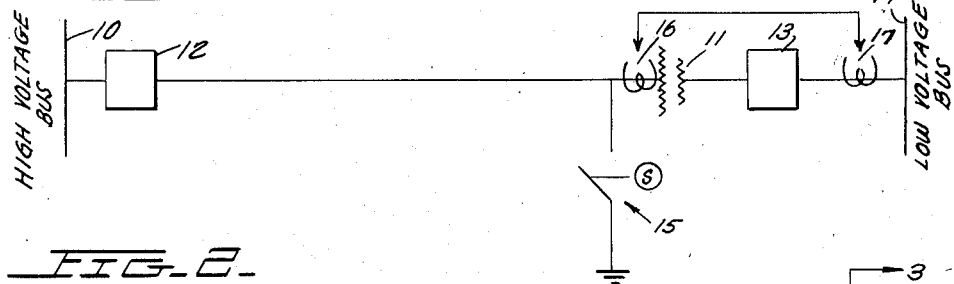
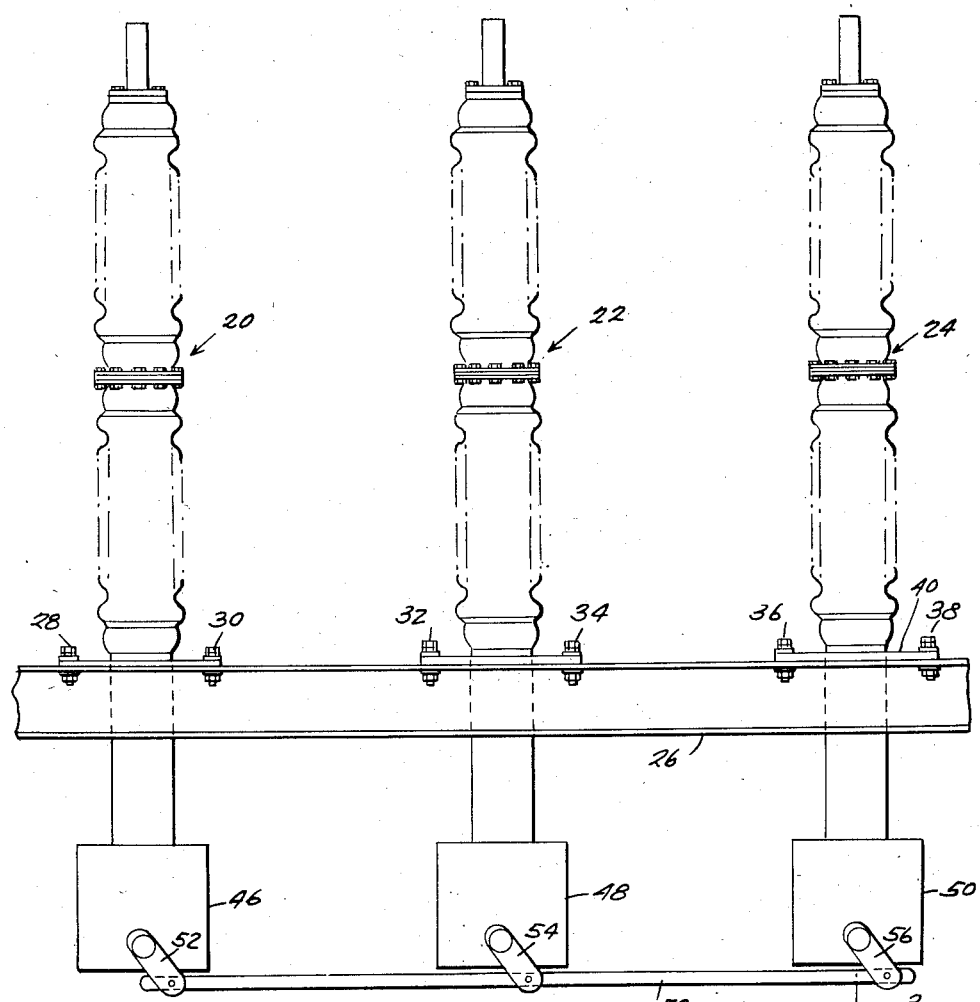
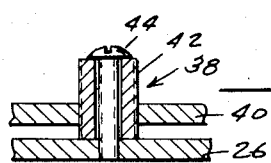
INVENTORS
AREM FOTI
HARRY W. KENNELTY, JR.
BY
ATTORNEYS

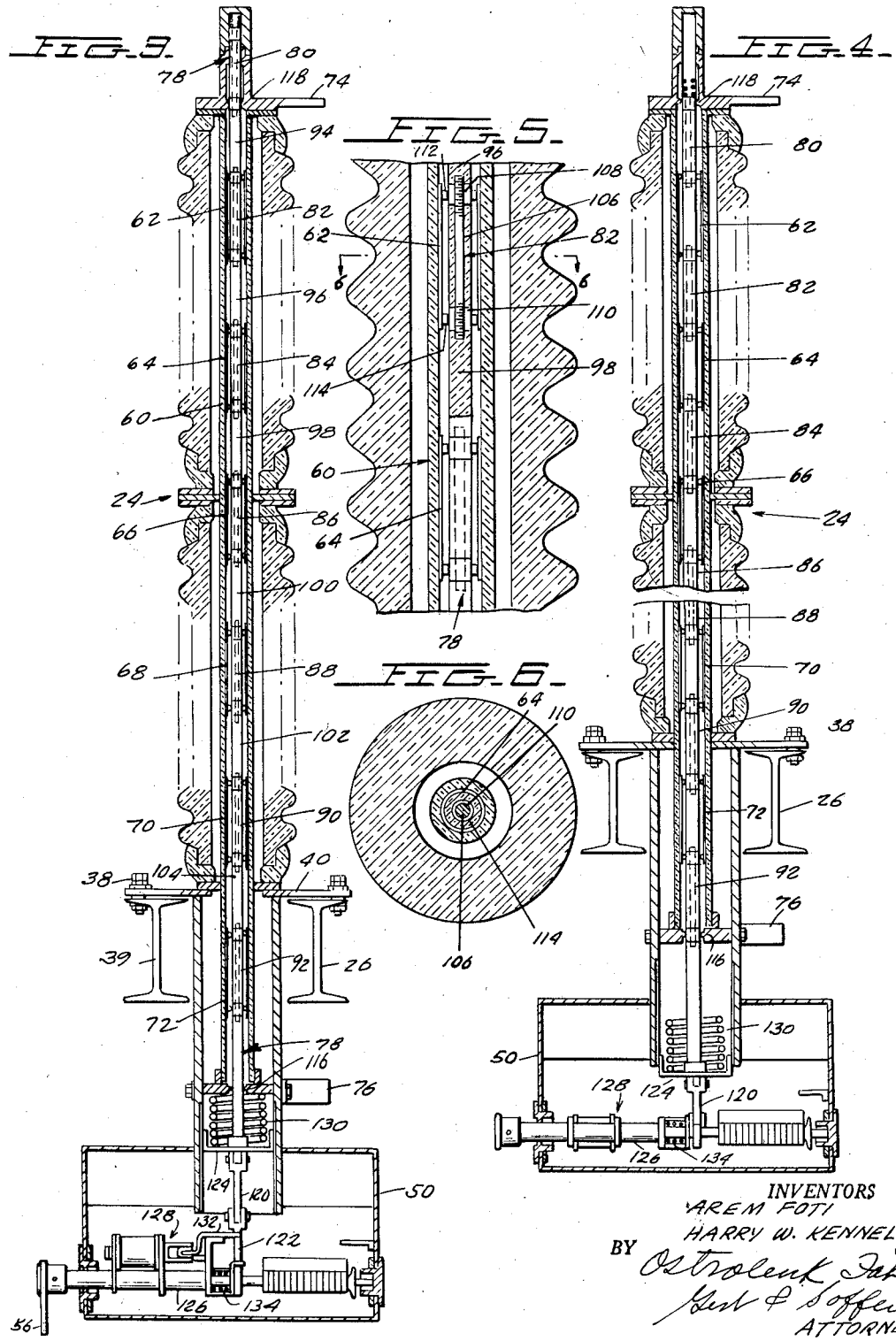

United States Patent Office 2,891,129
Patented June 16, 1959

2,891,129

HIGH VOLTAGE AUTOMATIC GROUNDING SWITCH

Arem Foti, Greensburg, and Harry W. Kennelty, Jr., Irwin, Pa., assignors to I-T-E Circuit Breaker Company, Philadelphia, Pa., a corporation of Pennsylvania Application February 19, 1957, Serial No. 641,107

1 Claim. (Cl. 200—145)

Our invention relates to a high speed automatic grounding switch and is more specifically directed to a switch which utilizes a plurality of series connected breaks which are connectable to one another by an axially movable member.

A high speed automatic ground switch is shown in copending application Serial No. 742,130, filed December 16, 1957, wherein the movable member for connecting a plurality of series connected breaks is rotatable to bring a plurality of bridging contacts into engagement with a respective plurality of stationary contacts so that the series connected breaks are connected together. The switch of the instant invention differs therefrom in the use of an axial, rather than rotary motion.

One common application of automatic grounding switches is to convert a high impedance fault on a transmission line system into a low impedance fault to thereby cause operation of fault responsive protective equipment. By way of example, the switch may be placed in a high voltage transmission line and in front of a transformer bank which converts this high voltage into a low voltage. The low voltage output of the transformer bank is usually taken through a low voltage circuit breaker to allow disconnection of the low voltage in the event of a fault in the low voltage system. When, however, the fault occurs in the transformer bank, it is desirable to cause rapid operation of a high voltage circuit interrupting device in the high voltage transmission system. However, the high voltage circuit interrupting equipment may see the fault as a high impedance one which is insufficient to cause their operation. In order to assure operation of the high voltage protective equipment and de-energization of the transformer bank, the automatic grounding switch is operated responsive to a fault in the transformer bank so as to convert this relatively high impedance fault into a low impedance fault on the high voltage transmission line, and cause subsequent energization of the protective high voltage circuit interrupting devices.

It has been the practice to construct this automatic grounding switch of a single long rotatable blade which moves to connect the high voltage line to ground responsive to a fault within a protected zone of the system, this fault being indicated in some cases by differential protective means on either side of the transformer bank.

The movable blade of the presently used grounding switches must be relatively long, this length being determined by the required separation between the line and ground contacts which in turn is determined by the line to ground voltage which is to be supported with the switch in its normally open position.

Because of this long length and resultant large moment of inertia of the switch blade, the time required to move the blade to the engaged position has been relatively long, and the power required to move the blade has been high.

Furthermore, the time required to move the blade to the engaged position even if the blade had a relatively low moment of inertia would be long in view of the large distance through which the blade must be moved.

The principle of our invention is to provide a novel multibreak type of contact system for an automatic grounding switch wherein the distance from ground to a line connection is spanned by a plurality of series connected contacts which are axially mounted and insulated from one another, and to thereafter provide an axially movable member which carries a plurality of bridging contacts whereby movement of the axially movable member over the distance spanned by only one pair of contacts of the multibreak contacts will cause the bridging contacts to bridge each of the multibreak contacts and thereby connect the line terminal to a ground connection.

Thus, in our novel switch the line to ground potential of the transmission system is normally supported by the plurality of multibreak contacts, and these multibreak contacts are connected in series with one another by means of an axially movable member which has to move only a fraction of the total distance between the line and ground terminal members. Thus, the time of operation of our novel grounding switch is extremely short, since only a relatively small distance must be covered by the grounding mechanism.

Furthermore, the above described problem of high inertia which is inherent in the long single blade type of switch is overcome by the instant invention, since it is only necessary that an elongated member which could be constructed of adjacently positioned contact members and insulators be moved along the axis thereof.

As well as providing an extremely fast operation, i.e., five cycles or less on a sixty cycle per second base, which may be derived from a driving source of relatively low power requirements, our novel device, as will be seen hereinafter, provides a high degree of economy in view of the inherent simplicity of the device. If desired, the plurality of multibreak contacts may be hollow ring-shaped members supported from an insulating member in space relationship with respect to one another. The movable member, which is movable responsive to predetermined conditions in the line being protected, may then be formed of a unitary member which could be an insulating rod having conducting sleeves fastened thereto in spaced relationship with one another, these sleeves serving as bridging contacts for a respective pair of adjacent contacts of the plurality of contacts described above.

In a first and disengaged position the conducting sleeves will be positioned immediately adjacent a respective stationary ring member of the stationary contact, and the sleeve will not interconnect adjacent ring-shaped contacts. When, however, an operating mechanism is operated responsive to a fault the movable rod will be axially moved with respect to the ring-shaped plurality of contacts so that each sleeve will advance to span the distance between a first and second stationary contact whereby each of the stationary contacts will be interconnected from their line terminal to their ground connection, and the grounding function is achieved.

Accordingly, the primary object of our invention is to provide a novel high speed automatic grounding switch.

Another object of our invention is to provide a novel automatic grounding switch which utilizes a plurality of series connected breaks which are connectable to one another by a respective plurality of axially movable bridging contact members.

A still further object of this invention is to provide an automatic grounding means for grounding a circuit responsive to a predetermined electrical condition which utilizes the axial motion of a plurality of bridging contacts.

Another object of our invention is to provide a novel automatic grounding switch wherein the movable member of the switch when moving between the engaged and disengaged position moves only a fraction of the distance between its two terminals.

Another object of our invention is to provide a novel automatic grounding switch which is simple in structure and has an extremely high operating speed in view of a plurality of axially movable bridging contacts which move through a relatively short distance and have a relatively low inertia, said movable bridging contacts interconnecting a respective plurality of series connected stationary contacts co-axially distributed in insulated relationship with one another with respect to said movable bridging contacts.

A still further object of our invention is to provide a novel automatic grounding switch wherein the contacts and contact operating mechanism is completely enclosed in a housing.

These and other objects of our invention will become apparent from the following description when taken in conjunction with the drawings in which:

Figure 1 shows a single line wiring diagram illustrating a typical application of an automatic grounding switch.

Figure 2 shows a side-plan view of the automatic grounding switch of our novel invention when ganged for three phase operation.

Figure 2A shows a cross-sectional view of an adjustable mounting means which mounts the insulator stack to the base.

Figure 3 shows a cross-sectional view through one of the phases of Figure 2 with the automatic grounding switch in a disengaged position.

Figure 4 is similar to Figure 3, but shows the switch in the engaged position.

Figure 5 is an enlarged cross-sectional view of Figure 3 which more particularly illustrates the construction of the axially movable member.

Figure 6 is a cross-sectional view of Figure 5 when taken across the lines 6—6.

Referring now to Figure 1 which shows one application of an automatic grounding switch, it is seen that a high voltage station bus 10 energizes a transformer bank 11 through the high voltage circuit breaker 12 where the high voltage circuit breaker 12 and the transformer bank 11 may be separated by many miles. The low voltage side of the transformer bank 11 is taken through a low voltage circuit breaker 13, and the line side of low voltage circuit breaker 13 is then connected to the low voltage station bus 14.

During operation of a system of this type the low voltage circuit breaker 13 will disconnect low voltage bus 14 and the low voltage side of transformer bank 11 responsive to a fault anywhere within the zone of protection between 16 and 17.

When, however, a fault occurs within the transformer bank 11 and in front of low voltage breaker 13, it is possible that this will be a relatively high impedance fault when seen by the high voltage circuit breaker 12 whereby the high voltage circuit breaker 12 would not interrupt the circuit and the transformer bank 11 may be severely damaged.

This condition may be avoided, however, by connecting the automatic grounding switch 15 to the high voltage side of the transformer bank 11, this automatic grounding switch being operative responsive to a fault within transformer bank 11. By way of example, the grounding switch operation could be initiated by the differential protection scheme offered by the current transformers 16 and 17 which are positioned on the high voltage and low voltage side respectively of the transformer bank 11.

In this case when a fault appears in transformer bank 11 the difference in the combined outputs current transformers 16 and 17 will initiate the closing of automatic grounding switch 15. Thus, the high voltage circuit breaker 12 will now see a low impedance fault to ground and will operate to open the high voltage transmission line and thus protect the faulted transformer bank 11.

Clearly, it is desirable that the automatic grounding switch 15 be operated as fast as possible so as to afford maximum protection to the transformer bank 11.

This, however, has been difficult to achieve in the past since, for purposes of economy, it was felt that a single long switch blade was required. This switch blade must be long enough to bridge the distance between the high voltage line potential and ground and because of this, the switch blade has a large radius of gyration and a correspondingly large moment of inertia.

Thus, the operation of the switch was relatively slow and it required a relatively large source of driving power.

We have found, however, that we can provide a device which features the same economics as does the single long blade type of switch, but yet imparts a relatively small moment of inertia to its moving components so as to allow relatively high speed operation.

Figure 2 shows a side-plan view of our novel switch when ganged for three phase operation. The switch, however, may be arranged for single-phase or two-phase operation equally well. The switches 20, 22, 24 of Figure 2 which will be described more fully hereinafter in conjunction with Figures 3 through 6 are fastened to a common support member such as I-beam 26 by the adjustable bolt members 28 and 30, 32 and 34, and 36 and 38 respectively.

As is seen in Figures 3 and 4 a similar support member or I-beam 39 is provided on the other side of switches 20, 22 and 24 with a similar adjustable bolt arrangement for supporting the switches.

The construction of each of the adjustable bolt devices is identical and is set forth in Figure 2A for the case of adjustable bolt means 38. In Figure 2A plate 40 is rigidly secured to switching device 24 and has a first screw member 42 threaded through a tapped aperture in plate 40, screw 42 having an aperture therein for passing a fastening screw 44. Fastening screw 44 can threadably engage a tapped aperture in I-beam 26, as shown in the figure, whereby adjustment of screw 42 within the tapped aperture of plate 40 will adjust the distance between plate 40 and I-beam 26 in view of the butting engagement between the end of screw 42 and the surface of I-beam 26. Once this adjustment is accomplished screw 44 is thereafter threaded into engagement to rigidly secure plate 40 to the I-beam through the screw 42.

Accordingly, by adjustably positioning screws 36 and 38 the angular position of switch 24 in the plane of the switches 20, 22 and 24 may be accomplished, and in a similar manner, by adjusting each of bolts 36 and 38 with respect to similar bolts operating on I-beam 39 (Figures 3 and 4), switch 24 may be angularly adjustable in a plane perpendicular to the plane of switches 20, 22 and 24.

Therefore, any desired angular adjustment of switch 24 may be achieved in a simple manner.

The operating mechanism for each of switches 20, 22 and 24 are identical to one another and are housed within housings 46, 48 and 50 respectively with their operating cranks 52, 54 and 56 respectively being ganged by the connecting member 58 in a manner well known in the art.

Thus, by manually operating member 58 each of switches 20, 22 and 24 will be simultaneously manually operated, while each of the switches may be individually operated in an automatic manner responsive to fault conditions or some predetermined condition regarding the particular phase to which it is connected.

Figures 3 and 4 are cross-sectional views taken across the lines 3—3 of Figure 2 and specifically illustrate the novel mechanism contained within the switch 24 and operating mechanism 50 in the open and closed positions respectively.

Referring now to Figures 3 and 4, the switching mechanism is comprised of an insulating tube 60 which has the contacts 62, 64, 66, 68, 70 and 72 fastened therein in insulated relationship with respect to one another. Positioned at the top and bottom respectively of the insulating tube 60 are upper contact or terminal member 74 and lower or ground contact member 76.

An axially movable rod 78 which is comprised of alternate conducting and insulating portions such as the conducting portions or bridging contacts 80, 82, 84, 86, 88, 90 and 92, and insulating portions 94, 96, 98, 100, 102 and 104 is then positioned within hollow insulating tube 60.

The construction of rod 78 may be best seen by reference to Figure 5 which specifically shows conducting portion 82 as comprising a stud 106 which is threaded into electrical and mechanical engagement with protruding conducting members or contact rings 108 and 110 at each end thereof. The threaded ends of stud 106 extend beyond either of conducting members 108 and 110, and further serve to threadably engage the insulating portions 96 and 98 adjacent the conducting portion 84. In this manner the complete rod is constructed of adjacent positioned conducting bridging contacts which are maintained in insulated relationship with respect to one another by the insulating portions. Thus, in Figure 5 conducting portion 82 serves as a bridging contact which comprises engaging portions 108 and 110, these two portions being electrically connected by the stud 106.

Each of the stationary contacts 62, 64, 66, 68, 70 and 72 are provided with protruding portions on their inner peripheries and at the outer ends of the cylinder such as the protruding portions 112 and 114 for the stationary contact member 62 of Figure 5.

Clearly, each of the other stationary contacts are constructed in a similar manner whereby protruding portions of the stationary contacts are engageable with respect to cooperating portions of the conducting portion of axially movable rod 78.

Similarly the ground terminal 76 is provided with a stationary contact member 116 which is engageable with the portion of the bottom-most conducting portion of rod 78 while a similar stationary contact structure 118 is engageable with the upper-most conducting portion of rod 78.

It is to be noted that the construction set forth in Figures 3, 4, 5 and 6 is for illustrative purposes only and that many modifications thereof are possible while still falling within the principle of our novel invention of providing a plurality of relatively stationary contacts which are insulated from one another and are engageable by a plurality of axially movable contacts so that the stationary contacts may be bridged to complete an electrical circuit between a first and second terminal.

So long as the axially movable member 78 is in a position set forth in Figures 3 and 5, it is seen that the bridging conducting member, such as bridging conducting member 84, does not interconnect adjacent stationary contacts such as stationary contacts 64 and 62 of Figure 5.

In operation, the rod 78 is driven in a downward direction to the position set forth in Figure 4, the conducting portions of the movable rod member will interconnect adjacent stationary contact members whereby the terminal 74 will be connected to the ground terminal 76.

The operating mechanism for moving rod 78 from the switch open position of Figure 3 to the switch closed position of Figure 4 could, of course, be of any desired type and if desired could be specifically of the type which would cause switch operation responsive to predetermined conditions on the lines being protected so that the automatic grounding operation set forth hereinabove may be achieved.

The operating mechanism set forth herein for illustrative purposes only is housed within the housing 50 and includes a toggle linkage comprising links 120 and 122 wherein one end of toggle link 120 is pivotally connected to a piston 124 which is in turn connected to rod 78. The other toggle link 122 is connected to shaft 126 of operating handle 56, the shaft 126 carrying thereon the solenoid mechanism 128.

Positioned within piston 124 is a compression spring 130 which is compressed to the position shown in Figure 3 when the switch is in the open position. The spring is maintained in this compressed position by latching the toggle comprising links 120 and 122 in the extended position, this latch member 132 opposing the biasing force of biasing spring 134.

If now the coil of solenoid mechanism 128 is energized by circuitry (not shown) responsive to fault condition, the solenoid plunger will trip the latching member 132 whereby the toggle formed by links 120 and 122 will collapse under the biasing force of spring 134 and the compression spring 130 will drive piston 124 and rod 78 downwardly to the position shown in Figure 4.

Once the switch has been moved to its closed position and it is desired to move it to its disengaged position (Figure 3), the manual operating crank 56 may be rotated whereby latching member 132 will pick up the toggle link 122 and drive the piston 124 and the rod 78 upwardly to the position of Figure 3 until the toggle links 120 and 122 pass their over-center position to latch rod 78 in its disengaged position.

It is to be noted that this mechanism is of the trip-free type since, if the switch is automatically operated during manual operation by manual operating crank 56, the solenoid will trip latching member 132 to allow automatic operation to proceed independently of the operating crank 56.

That is to say, the operating crank 56 will lose control of the switch operating if automatic operation of the switch is required.

Although we have described preferred embodiments of our novel invention, many variations and modifications will now be obvious to those skilled in the art, and we prefer therefore to be limited not by the specific disclosure herein but only by the appended claim.

We claim:

In an automatic grounding switch; a relatively stationary hollow insulating cylinder; said insulating cylinder having a plurality of elongated stationary contacts spaced along an internal surface thereof in insulating relationship with respect to one another; a first contact of said plurality of contacts being positioned toward one end of said insulating cylinder and being connectible to a first potential, a second contact of said plurality of contacts being positioned toward the opposite end of said insulating cylinder and being connectible to a ground potential; a movable contact support rod constructed to be axially movable with respect to said insulating cylinder and being coaxially and concentrically positioned with respect thereto; said movable contact support rod being comprised of a plurality of alternately positioned, coaxial insulating sections and conductive stud sections and a plurality of movable contact elements; each of said conductive stud sections having a threaded fastening means terminating each end; each of said conductive stud sections having one of said plurality of movable contact elements positioned at each end; each of said insulating portions having a threaded fastening means at each end for cooperating with the said threaded fastening means positioned at the end of the conductive stud member adjacent thereto; said movable contact elements being interposed between and held in position by engagement of said threaded fastening means of said insulating sections and said adjacent conductive stud members; each of said movable contact elements terminating each of said conductive studs being axially spaced by a distance substantially equal to the axial distance between the adjacent ends of an adjacent pair of said elongated stationary contacts and forming a bridging contact; each of said bridging contacts of said movable contact rod being axially movable into bridging contact engagement with a respective pair of said adjacent stationary contacts carried by said insulating cylinder responsive to axial movement to thereby electrically connect said first contact to said second contact to thereby create a low impedance fault in the line connected to said first contact.

References Cited in the file of this patent

UNITED STATES PATENTS

| | | |
|---|---|---|
| 862,513 | Robinson | Aug. 6, 1907 |
| 2,215,584 | Hetherington | Sept. 24, 1940 |
| 2,223,731 | Lingal | Dec. 3, 1940 |
| 2,675,505 | Flurscheim et al. | Apr. 13, 1954 |
| 2,762,881 | Brockwell et al. | Sept. 11, 1956 |